March 24, 1931.    R. C. HOFFMAN    1,797,576
POWER TRANSMITTING MECHANISM
Filed Feb. 24, 1928    3 Sheets-Sheet 1
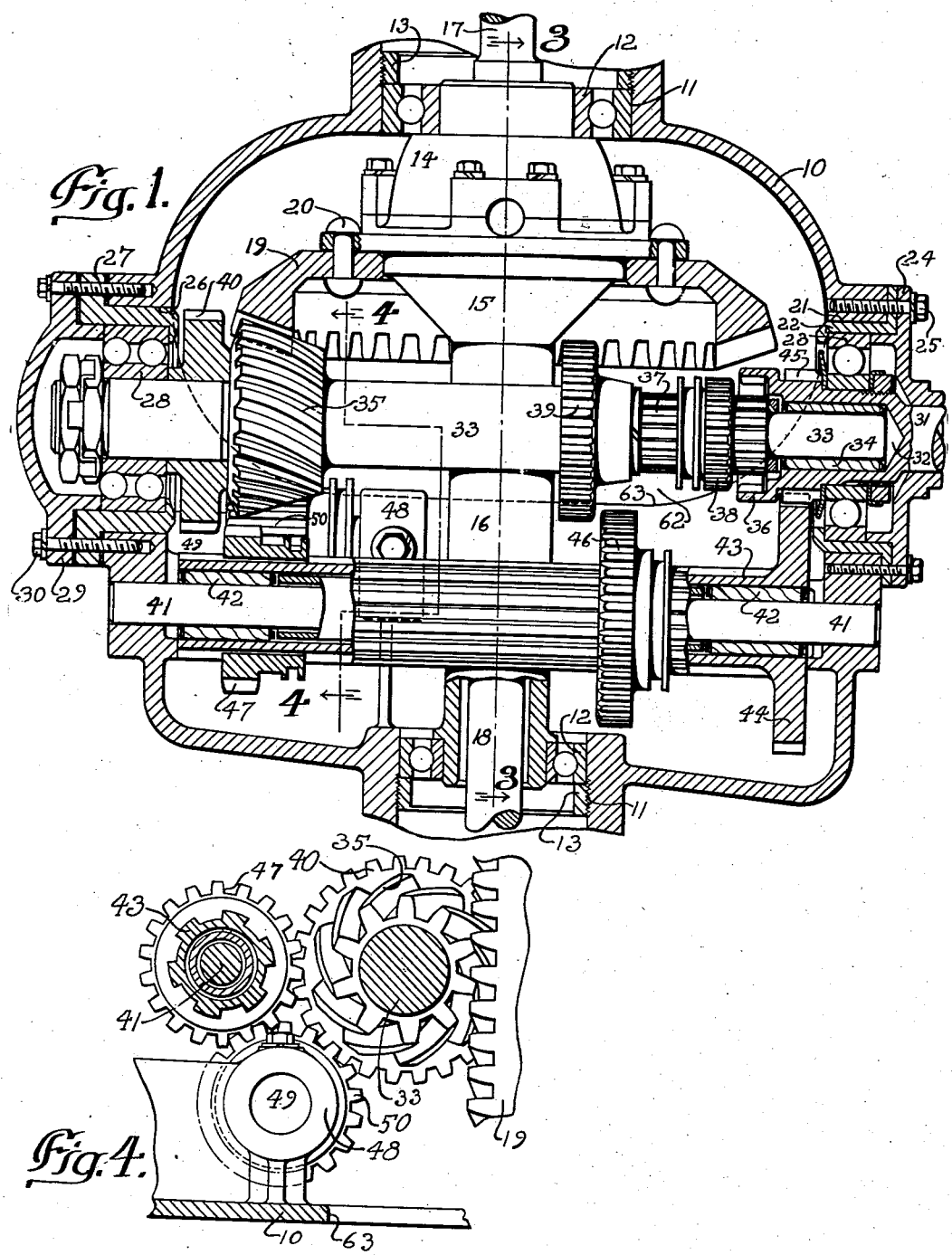
INVENTOR
ROSCOE C. HOFFMAN.
BY
Irving Harness
ATTORNEY

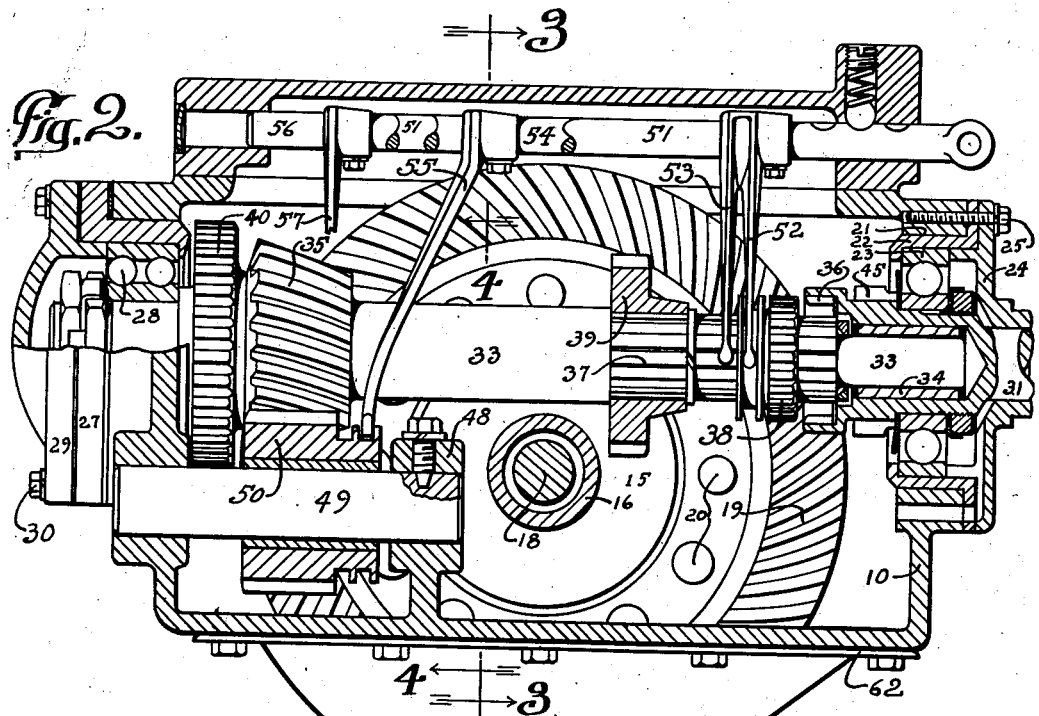
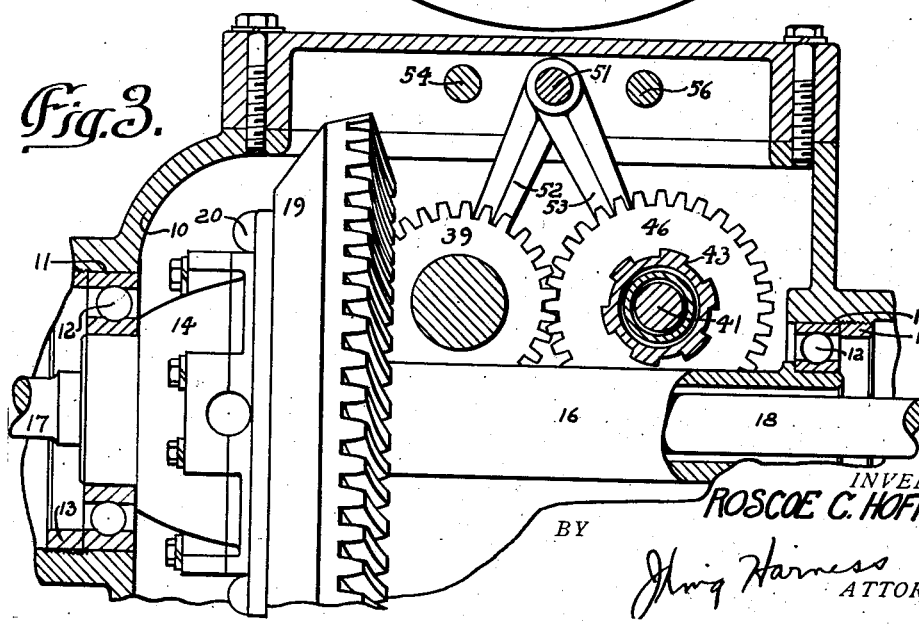

INVENTOR
ROSCOE C. HOFFMAN.
BY
ATTORNEY

Patented Mar. 24, 1931

1,797,576

UNITED STATES PATENT OFFICE

ROSCOE C. HOFFMAN, OF DETROIT, MICHIGAN

POWER-TRANSMITTING MECHANISM

Application filed February 24, 1928. Serial No. 256,538.

This invention relates to power transmitting mechanism and particularly to a mechanism applicable for use in connection with a motor vehicle, the principal object being the provision of a construction wherein the change speed mechanism is so arranged with respect to the connection between the power shaft and axle shafts that the combined fore and aft length thereof is materially diminished over the conventional constructions.

Another object is to provide a power transmitting mechanism applicable to motor vehicles that will be of less size and weight than conventional constructions, that will employ less anti-friction bearings, and that consequently will be capable of manufacture at a smaller cost.

Another object is to provide a construction for transmitting power from the power unit of a motor vehicle to the driving axle thereof in which the drive shaft extends from the motor past the axle shafts and is provided with a driving connection with the axle shafts on the side thereof opposite the power unit.

Another object is to provide a driving axle construction for motor vehicles and the like, in which the change speed gearing is disposed both forwardly and rearwardly of the axle shafts.

Another object is to provide a driving axle construction for motor vehicles and the like wherein the change speed mechanism may be disposed wholly within the diameter of the axle ring or driven gear.

Another object is to provide a driving axle construction for motor vehicles in which the axle shafts are driven by a suitable ring gear disposed concentrically therewith, a power unit being disposed on one side of the axle shafts and driving a line of shafting extending across the axle shafts to the opposite side of the ring gear where it is operatively connected to the ring gear, a counter shaft being disposed across the axle shafts in parallel relation with the line of shafting and being provided with change speed gearing cooperating with gears on the line of shafting to effect a change of ratio in the drive from the power unit to the ring gear.

Another object is to provide a driving axle construction for motor vehicles in which the axle shafts are driven by a hypoid ring gear, a line of shafting from the power unit extending across the axle shafts and being provided thereon on the opposite side of the axle shafts from the power unit with a hypoid pinion gear meshing with the ring gear.

A further object is to provide a power transmitting mechanism particularly adaptable for use in connection with front wheel drive motor vehicles and which will allow a greater concentration of weight on the front wheels thereof than in constructions heretofore suggested, such weight concentration permitting a greater tractive effort to be applied to the front wheels without causing them to slip.

The above being among the objects of the present invention, the same consists in certain features of construction and combinations of parts to be hereinafter described with reference to the accompanying drawings, and then claimed, having the above and other objects in view.

In the accompanying drawings which illustrate suitable embodiments of the present invention, and in which like numerals refer to like parts throughout the several different views,—

Fig. 1 is a more or less diagrammatic horizontal section taken through one embodiment of my axle construction.

Fig. 2 is a more or less diagrammatic vertical sectional view taken longitudinally of the drive shaft of the construction shown in Fig. 1.

Fig. 3 is a sectional view taken on line 3—3 of Fig. 2.

Fig. 4 is a view taken on line 4—4 of Fig. 2 showing the reverse idler gear.

Figure 5:
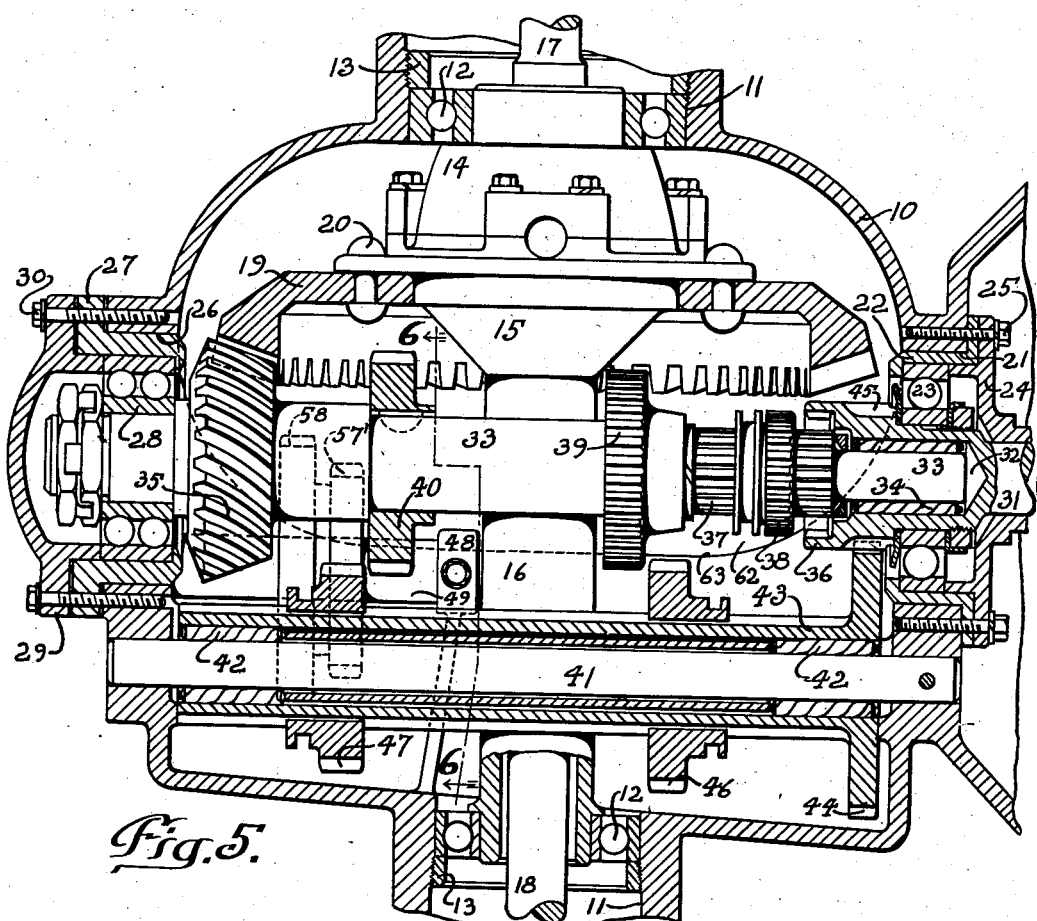
Fig. 5 is a view similar to Fig. 1 in which the change speed gearing is slightly modified to provide a more compact construction.

There are many instances in motor vehicle design where it would be extremely advantageous to shorten the length of the driving connection between the power unit and the driven axles and still provide the necessary speed changing mechanism between the power unit and the axle shafts without transmitting through the change speed mechanism a torque greater than that supplied directly by the engine. This is particularly true where the driving wheels are positioned at the front of the vehicle, although it may be true in many instances where the driving wheels are placed at the rear of the vehicle. The construction disclosed in the present invention permits such shortening of the driving connection between the engine and the driven axles or axle members, but is also applicable to constructions wherein this feature is of less importance than is the unusual compactness afforded by my invention and the possible reduction of weight from that of conventional constructions.

As illustrative of the present invention I show in Figs. 1, 2, 3 and 4 one modification in which a housing 10 is provided which corresponds with the usual differential housing in conventional constructions. The housing 10 is provided at each side with an opening 11 in each of which a suitable anti-friction bearing 12 is secured in place by a nut 13. A differential carrier is rotatably supported between the bearings 11 and comprises the casing half 14 and cooperating half 15. The portion 14 is supported immediately adjacent one of the bearings 12, and the portion 15 is provided with an elongated tubular extension 16 which extends across the casing and is suitably supported in the opposite bearing 12. The casing halves 14 and 15 enclose and support the usual differential gearing which connects the axle shafts 17 and 18. A ring gear 19 of the hypoid type is secured to the differential carrier by rivets 20 or other suitable means in concentric relation therewith.

One end of the housing 10 is provided with an opening 21 in which the bearing carrier 22 is received, the carrier 22 supporting the anti-friction bearing 23 which is held in place therein by the cap 24 in accordance with conventional practice, the cap 24 and bearing carrier 22 being secured to the housing 10 by bolts 25 or other suitable means. The opposite end of the housing 10 is provided with an opening 26 in which is received the bearing carrier 27 which supports the anti-friction bearing 28 and which is secured in place therein by the cap 29 and bolts 30 similar to the construction at the opposite end of the case. Suitably supported in the bearing 11 is the end of a shaft 31 which in the case of a vehicle driven through the rear wheels, may be connected to the conventional propeller shaft, and which, in front wheel drive constructions, may be the forward end of the clutch driven shaft. The end of the shaft 31 is provided with a central opening 32 in which one end of the main transmission shaft 33 is rotatably supported with the aid of the anti-friction bearings 34. The shaft 33 extends across the case, and in the particular embodiment shown, above the axle shafts 17 and 18 and portion 16 of the differential carrier, and is rotatably supported at its opposite end in the bearing 28. The left hand end of the shaft 33 as viewed in Fig. 1, has formed thereon a pinion gear 35 which lies in meshing relationship with the ring gear 19 so as to transmit driving movement thereto upon rotation of the shaft 33. The left-hand end of the shaft 31 as viewed in Fig. 1 is provided with the female member of a dog clutch in the form of a clutch member 36. That portion of the shaft 33 within the clutch member 36 and extending to the left thereof as viewed in Fig. 1 has formed thereon splines 37, and slidably but non-rotatably mounted on such portion of the shaft is the male portion of the dog clutch in the form of a spur gear 38, shown in disengaged position. It will be apparent, of course, that when the clutch member 38 is moved axially of the shaft 33 to the right as shown in Fig. 1, it will be received within the clutch member 36 and will thereby lock the shafts 33 and 31 together for equal rotation. This is a preferable construction where mechanism is to be employed in a front wheel drive vehicle, but it will be apparent that if the mechanism is to be employed in a rear wheel drive vehicle where the transmission is preferably mounted on or near the power unit, the shafts 31 and 33 may be formed integrally with each other. Such a construction may be preferable in certain types of rear wheel drive motor vehicles for various reasons.

In the present case a spur gear 39 is non-rotatably secured against axial movement to the shaft 33, a sufficient distance to the right of the differential carrier in order to sufficiently clear the same during rotation, and a second spur gear 40 is non-rotatably secured to the shaft 33 immediately to the left of the pinion 35. A counter shaft supporting member 41 is suitably supported in the housing 10 in parallel relationship with respect to the shaft 33, and on that side thereof opposite the ring gear 19 and rotatably supported on the member 41 by the anti-friction bearings 42 is a counter shaft 43 having a gear 44 formed integrally therewith on its right-hand end which gear meshes with the gear 45 formed on the left-hand end of the shaft 31, thus providing the constant mesh gears of the change speed mechanism.

The counter shaft 43 carries the gear 46 thereon, the gear 46 being axially slidable but non-rotatable with respect to the shaft and being of a diameter so that upon suitable axial movement it may properly mesh with the gear 39 on the shaft 33. The counter shaft 43 is further provided with an axially slidable and relatively non-rotatable gear 47 of a diameter to suitably mesh, upon proper axial movement, with the gear 40 secured to the shaft 33. The clutch member 38, and the gears 46 and 47 which constitute the sliding elements of the change speed mechanism thus far described, are provided with the conventional grooved collars which suitable shifting yokes are adapted to engage, as will presently be described.

From the construction thus far described, it will be apparent that the gears in the position indicated in Figs. 1 and 2 are such that upon rotation of the shaft 31 no driving power will be transmitted to the ring gear, the shaft 31 and counter shaft 43 merely rotating. If the clutch member 38 is shifted into engagement with the clutch member 36, the shafts 31 and 33 will be locked together for equal rotation and the driving power from the shaft 31 will be transmitted directly to the shaft 33 and thence by the pinion 35 to the ring gear 19 and accordingly to the axle shafts 17 and 18. If the clutch member 38 is in the position indicated in the drawing, and the gear 47 is moved into engagement with the gear 40, the driving power from the shafts 31 will be transmitted through the gears 45 and 44 to the counter shaft 43 and from the counter shaft 43 through the gears 47 and 40 to the shaft 33, and thence through the pinion 35 to the ring gear 19, thus effecting the low gear operation of the change speed mechanism. If, on the other hand, the gear 47 is in the position shown in the drawing and the gear 46 is moved into meshing relationship with the gear 39, the power from the shaft 31 will be transmitted through the gears 45 and 44 to the counter shaft and from the counter shaft through the gears 46 and 39 to the shaft 33, and thence through the pinion 35 to the ring gear 19, thus driving through second or intermediate speed.

The reverse mechanism may be taken care of in the following manner. An upwardly extending supporting bracket 48 is formed on the bottom wall of the casing 10 between the shaft 33 and counter shaft 43, and between the pinion 35 and the axle shafts, and a short shaft 49 is supported between the support 48 and the left-hand end of the housing 10. An idler gear 50 is slidably and rotatably supported on the shaft 49 in a position to be moved into simultaneous engagement with both the gears 47 and 40, it being provided with a face sufficiently wide to engage both of these gears when the gear 47 is in the position indicated in Fig. 1 and may normally be positioned in engagement with the gear 47 so as to be constantly driven by the same, or, if desired, the bracket may be positioned so that the gear 50 may be moved sufficiently to be released from the gear 47 when not in active use.

It will be apparent that if the shiftable transmission elements are in the position indicated in Figs. 1 and 2, and the gear 50 is shifted axially into engagement with both the gears 47 and 40, the power from the shaft 31 will be transmitted through the gears 45 and 44 to the counter shaft, from the counter shaft through the gear 47 to the gear 50 and from the gear 50 to the gear 40 thus reversing the direction of rotation of the shaft 33 in respect to the shaft 31 and providing the reverse drive for the mechanism.

It will be apparent from the foregoing that there are thus four shiftable elements in the speed change mechanism, namely, the clutch member 38 and the gears 46, 47 and 50. The clutch element 38 and gear 46 may be shifted by a single shifter shaft 51 provided with one yoke arm 52 engaging the groove in the clutch member 38, and with a second yoke arm 53 engaging the groove in the gear 46. Thus by moving the shifter rod 51 to the right the clutch member 38 will engage the clutch member 36 and place the change speed mechanism in direct drive position; while if the shifter rod 51 is moved to the left, the clutch member 38 will be drawn out of engagement with the clutch member 36, and the gear 46 will be put into engagement with the gear 39 and the speed change mechanism will be placed in second or intermediate speed position. A separate shifter shaft 54 provided with a yoke arm 55 is necessary for shifting the reverse gear 50, and a third shifter shaft 56 provided with a yoke arm 57 engaging the gear 47 will be necessary for shifting the gear 47. The employment of three shifter shafts for controlling change speed mechanism is conventional practice and is readily and simply taken care of by the employment of a single control member.

In the modification shown in Fig. 5 the parts are slightly rearranged from that shown in Fig. 1 to provide a more compact construction, and this is more desirable where the ratio of speed changes in the mechanism are small enough to permit the use of gears of a size sufficiently small to be received on the main transmission shaft within the limits of the ring gear. In this case the end walls of the housing 10 are moved closer to the outer edges of the ring gear and the outer diameter of the clutch member 36 is reduced sufficiently to clear the ring gear and is projected to a point within the diameter of the same. The gear 40 instead of being secured back of the pinion 35, is positioned in front of it, thus allowing that end of the housing 10 to be shortened a corresponding amount. The gear 47 is, of course, moved on the counter shaft 43 to a position adjacent the gear 40, and the reverse idler gear is moved in accordance therewith. The gear 47 and reverse idler gear in this case, instead of being moved to the left for engagement with the gear 40, as in Fig. 1, are moved to the right, as indicated in Fig. 5, and the reverse idler gear in this case is made up of two gears 57' and 58 integrally connected together. The gear 57' is of sufficiently small diameter to clear the gear 47 when in line with it but placed to properly mesh with the gear 40 when shifted, and the gear 58 is of a size suitable to mesh with the gear 47. In this case the idler gears 57' and 58 do not rotate when not in active use and need be shifted a minimum distance to be placed in operative position.

The housing 10 may, of course, be varied to suit the particular construction which it is to be used in connection with. For instance, if it is to be used as a component part of the rear axle, the sides of the housing may be provided with the conventional tubular axle housings,—and if it is to be employed for a front wheel drive mechanism suitable flanges may be provided on the housing 10 for direct connection to the clutch housing carried by the power unit. In cases where the construction is used for front wheel drives the shafts 17 and 18 will, in most constructions, terminate adjacent the sides of the housing and be suitably connected by universal joints to other shafts extending into driving relationship with respect to the front wheels.

Figures 6, 7:
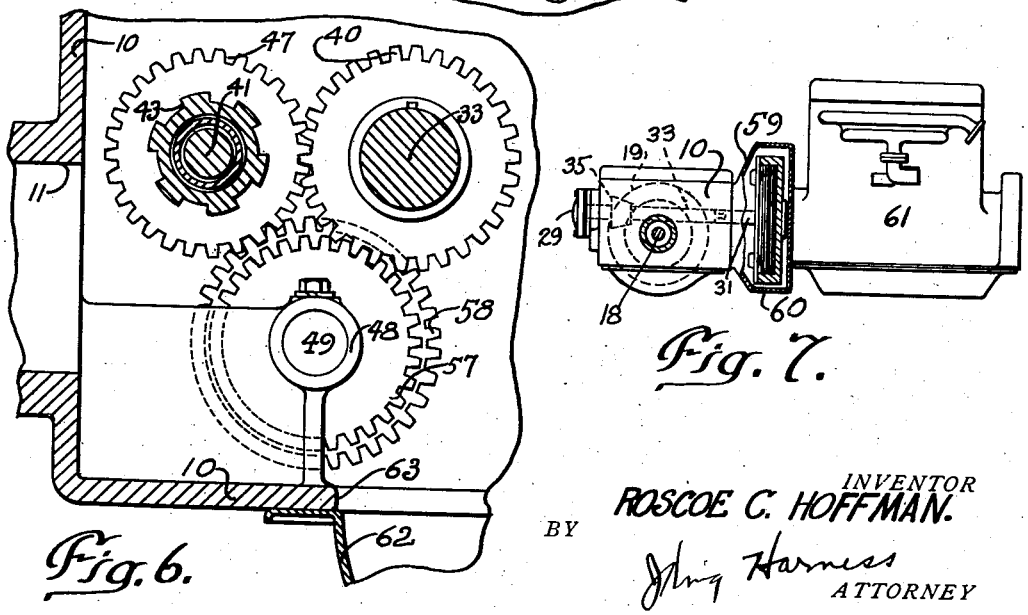
Fig. 6 is a view taken on line 6—6 of Fig. 5.
Fig. 7 is a diagrammatic view illustrating the position of the power unit in respect to the connection between the power shafting and the ring gear, in relation to the axle shafts.

The application of the construction to a front wheel drive mechanism is shown diagrammatically in Fig. 7. As shown in that view, the housing 10 is provided with a flanged housing extension 59 which is secured directly to the clutch housing 60 which in turn is supported directly on the engine 61. The shaft 31 in Figs. 1 and 2, or in Fig. 5, in such a case may be the clutch driven shaft. It will be evident that the construction illustrated eliminates the usual length of the transmission in the hook-up between the engine and the driven axle shafts, eliminates the usual bearing provided at the outer end of the clutch driven shaft because the bearing 23 takes its place, and allows the engine to be moved nearer the front wheels, thus concentrating more weight on the front wheels and allowing more tractive effort to be exerted by them without slipping. Also, when the transmission shaft 33 is placed above the axle shafts as shown in the drawings, although it may be positioned below them with this construction, the axis of the engine crankshaft is positioned a material distance above the axes of the axle shafts, thus allowing the engine to be positioned to provide a greater ground clearance for the vehicle than in conventional front wheel drive constructions, without any of the usual attendant difficulties which would otherwise be experienced.

The ease of assembling and disassembling the construction shown may be noted. Upon removal of the cap 29 the carrier 25, bearing 28, shaft 33, gear 39 and clutch member 38 may be removed through the opening 26. The counter shaft support 41 may then be removed, the bottom plate 62 which closes the opening 63 in the bottom of the housing may be removed, and the counter shaft with the gears 46 and 47 removed through the opening 63. The shafts 17 and 18 may be removed endwise as in convention constructions, one of the nuts 13 backed off of its bearing 12, and the differential may then be dropped through the opening 63. These features provide a very simple servicing device.

It is to be noted that in this construction it is preferable to use the hypoid type of gears which permit the drive shaft to extend across the axle shafts. It may be noted that in a worm drive the drive shaft could extend across the wheel but in such case it would be impossible to employ the gears in anything like as compact an arrangement as is possible by the use of hypoid gears, and in addition, the disadvantages of the use of worm gears for general work as has generally been found in this country, would still be present.

It will be apparent, of course, that the relative positions of the gears may be changed to suit an individual case, or for other reasons. For instance, in the construction indicated in Fig. 1, it may be preferable to move the gear 39 to the left-hand side of the axle shafts, in order to lessen the bending stresses in the transmission shaft during power application through the same, and such rearrangement is obvious to those skilled in the art as well as many other possible variations in the general design, and these and other formal changes may be made in the specific embodiment of the invention described without departing from the spirit or substance of the broad invention, the scope of which is commensurate with the appended claims.

What I claim is:

1. In a power transmitting mechanism, a pair of shafts supported in end to end relationship, a differential connecting said shafts, a gear operatively connected to said shafts through said differential, a power shaft, a fourth shaft rotatably supported relative to said power shaft and having a driving connection with a gear in mesh with the first mentioned gear, said fourth shaft extending across at least one of the first mentioned shafts, and means within the extended circumference of the first mentioned gear for locking said fourth shaft to said power shaft for equal rotation therewith.

2. In a power transmitting mechanism, a pair of driven shafts supported in end to end relationship, a differential connecting said shafts, a gear operatively connected to said shafts through said differential for rotating the same, a power shaft, a transmission shaft rotatably supported relative to said power shaft extending across one of said driven shafts and provided with a gear in mesh with the first mentioned gear, and means for driving said transmission shaft from said power shaft comprising a counter shaft and gears on said counter shaft and said transmission shaft engageable with each other, said counter shaft extending over one of said driven shafts and at least one of the last mentioned gears being wholly within the axially extended circumference of the first mentioned gear.

3. In a power transmitting mechanism, a pair of shafts supported in end to end relationship, a differential connecting said shafts, a ring gear operatively connected to said differential and concentric therewith, a second shaft extending across one of the first mentioned shafts and provided with a pinion in mesh with said ring gear, a third shaft extending across one of the first mentioned shafts in parallel relationship with said second shaft, a fourth shaft in driving relation with respect to said third shaft, means within the axially extended circumference of said ring gear for direct drive connection of said second shaft to said fourth shaft, and gears on said second and third shafts within the axially extended circumference of said ring gear engageable to drive said second shaft from said third shaft.

4. In a power transmitting mechanism, in combination, a pair of aligned shafts, differential mechanism connecting said shafts, a ring gear carried by said differential, a transmission shaft extending across said differential mechanism between the top and bottom limits of said ring gear, a pinion on said transmission shaft in mesh with said ring gear, a gear on said transmission shaft lying within the axially extended circumference of said ring gear, a counter shaft lying in parallel relation with respect to said transmission shaft, a gear on said counter shaft cooperable with the third mentioned gear, and means for driving said counter shaft from that end thereof more remote from said pinion.

5. In a device of the class described, in combination, a pair of driven shafts supported in end to end relationship, a differential mechanism connecting said shafts, a ring gear secured to said differential mechanism for driving the same, a main transmission shaft disposed both forwardly and rearwardly of and at an angle to said driven shafts, a pinion secured to said transmission shaft and lying in meshing relation with respect to said ring gear, a counter shaft in parallel relation with said transmission shaft, a gear on said transmission shaft lying at least in part within the axially extended circumference of said ring gear, a gear on said counter shaft adapted to mesh with said gear on said transmission shaft, a drive shaft, means for driving said counter shaft from said drive shaft, and means for driving said transmission shaft directly from said drive shaft.

6. In a device of the class described, in combination, a pair of driven shafts supported in end to end relationship, a differential mechanism connecting said shafts, a ring gear secured to said differential mechanism for driving the same, a main transmission shaft disposed both forwardly and rearwardly of and at an angle to said driven shafts, a pinion secured to said transmission shaft and lying in meshing relation with respect to said ring gear, a counter shaft in parallel relation with said transmission shaft, a gear on said transmission shaft, a gear on said counter shaft lying wholly within the axially extended circumference of said ring gear and adapted to mesh with said gear on said transmission shaft, a drive shaft, means for driving said counter shaft from said drive shaft, and means for driving said transmission shaft directly from said drive shaft.

7. In a device of the class described, in combination, a pair of driven shafts supported in end to end relationship, a differential mechanism connecting said shafts, a ring gear secured to said differential mechanism for driving the same, a main transmission shaft disposed both forwardly and rearwardly of and at an angle to said driven shafts, a pinion secured to said transmission shaft and lying in meshing relation with respect to said ring gear, a counter shaft in parallel relation with said transmission shaft, a gear on said transmission shaft, a gear on said counter shaft adapted to mesh with said gear on said transmission shaft, a drive shaft, means for driving said counter shaft from said drive shaft, and means for driving said transmission shaft directly from said drive shaft comprising a positive clutch lying at least in part within the axially extended circumference of said ring gear.

8. In a device of the class described, in combination, a pair of driven shafts supported in end to end relationship. a differential mechanism connecting said shafts, a ring gear secured to said differential mechanism for driving the same, a main transmission shaft disposed both forwardly and rearwardly of and at an angle to said driven shafts, a pinion secured to said transmission shaft and lying in meshing relation with respect to said ring gear, a counter shaft in parallel relation with said transmission shaft, a gear on said transmission shaft lying at least in part within the axially extended circumference of said ring gear, a gear on said counter shaft lying wholly within the axially extended circumference of said ring gear and adapted to mesh with said gear on said transmission shaft, a drive shaft, means for driving said counter shaft from said drive shaft, and means for driving said transmission shaft directly from said drive shaft.

9. In a device of the class described, in combination, a pair of driven shafts supported in end to end relationship, a differential mechanism connecting said shafts, a ring gear secured to said differential mechanism for driving the same, a main transmission shaft disposed both forwardly and rearwardly of and at an angle to said driven shafts, a pinion secured to said transmission shaft and lying in meshing relation with respect to said ring gear, a counter shaft in parallel relation with said transmission shaft, a gear on said transmission shaft lying at least in part within the axially extended circumference of said ring gear, a gear on said counter shaft adapted to mesh with said gear on said transmission shaft, a drive shaft, and means for driving said counter shaft from said drive shaft, and means for driving said transmission shaft directly from said drive shaft comprising a positive clutch lying at least in part within the axially extended circumference of said ring gear.

10. In a device of the class described, in combination, a pair of driven shafts supported in end to end relationship, a differential mechanism connecting said shafts, a ring gear secured to said differential mechanism for driving the same, a main transmission shaft disposed both forwardly and rearwardly of and at an angle to said driven shafts, a pinion secured to said transmission shaft and lying in meshing relation with respect to said ring gear, a counter shaft in parallel relation with said transmission shaft, a gear on said transmission shaft, a gear on said counter shaft lying wholly within the axially extended circumference of said ring gear and adapted to mesh with said gear on said transmission shaft, a drive shaft, means for driving said counter shaft from said drive shaft, and means for driving said transmission shaft directly from said drive shaft comprising a positive clutch lying at least in part within the axially extended circumference of said ring gear.

11. In a device of the class described, in combination, a pair of driven shafts supported in end to end relationship, a differential mechanism connecting said shafts, a ring gear secured to said differential mechanism for driving the same, a main transmission shaft disposed both forwardly and rearwardly of and at an angle to said driven shafts, a pinion secured to said transmission shaft and lying in meshing relation with respect to said ring gear, a counter shaft in parallel relation with said transmission shaft, a gear on said transmission shaft lying at least in part within the axially extended circumference of said ring gear, a gear on said counter shaft lying wholly within the axially extended circumference of said ring gear adapted to mesh with said gear on said transmission shaft, a drive shaft, means for driving said counter shaft from said drive shaft, and means for driving said transmission shaft directly from said drive shaft comprising a positive clutch lying at least in part within the axially extended circumference of said ring gear.

12. In a power transmitting mechanism, a pair of concentric shafts connected together by a differential mechanism, a recessed ring gear secured to said differential mechanism, a main transmission shaft extending across at least one of the first mentioned shafts and being provided with a pinion meshing with said ring gear on the side of the first mentioned shaft opposite to the power means for said transmission shaft, a counter shaft lying in parallel relation with respect to said transmission shaft, a gear on said transmission shaft extending into the recess of said ring gear, a gear on said counter shaft adapted to mesh with said gear on said transmission shaft, a drive shaft, and means to selectively drive said transmission shaft directly from said drive shaft or through said counter shaft.

13. In a power transmitting mechanism, in combination, a pair of shafts supported in end to end relationship, a differential connecting said shafts, a ring gear connected to said differential, a transmission shaft extending angularly across one of said pair of shafts and provided with a pinion non-rotatably secured thereto in mesh with said ring gear, a counter shaft in parallel relation with respect to said transmission shaft, gears on said transmission shaft lying at least in part within the axially extended circumference of said ring gear, gears on said counter shaft engageable with said gears on said transmission shaft, and a drive shaft on the side of said ring gear opposite to said pinion operatively connected to said counter shaft.

ROSCOE C. HOFFMAN.